April 7, 1942.    A. D. L. HUTCHINSON    2,278,446
DUMP TRUCK
Filed June 15, 1940    4 Sheets-Sheet 1

INVENTOR
A.D.L. HUTCHINSON
BY
Cook & Robinson
ATTORNEY

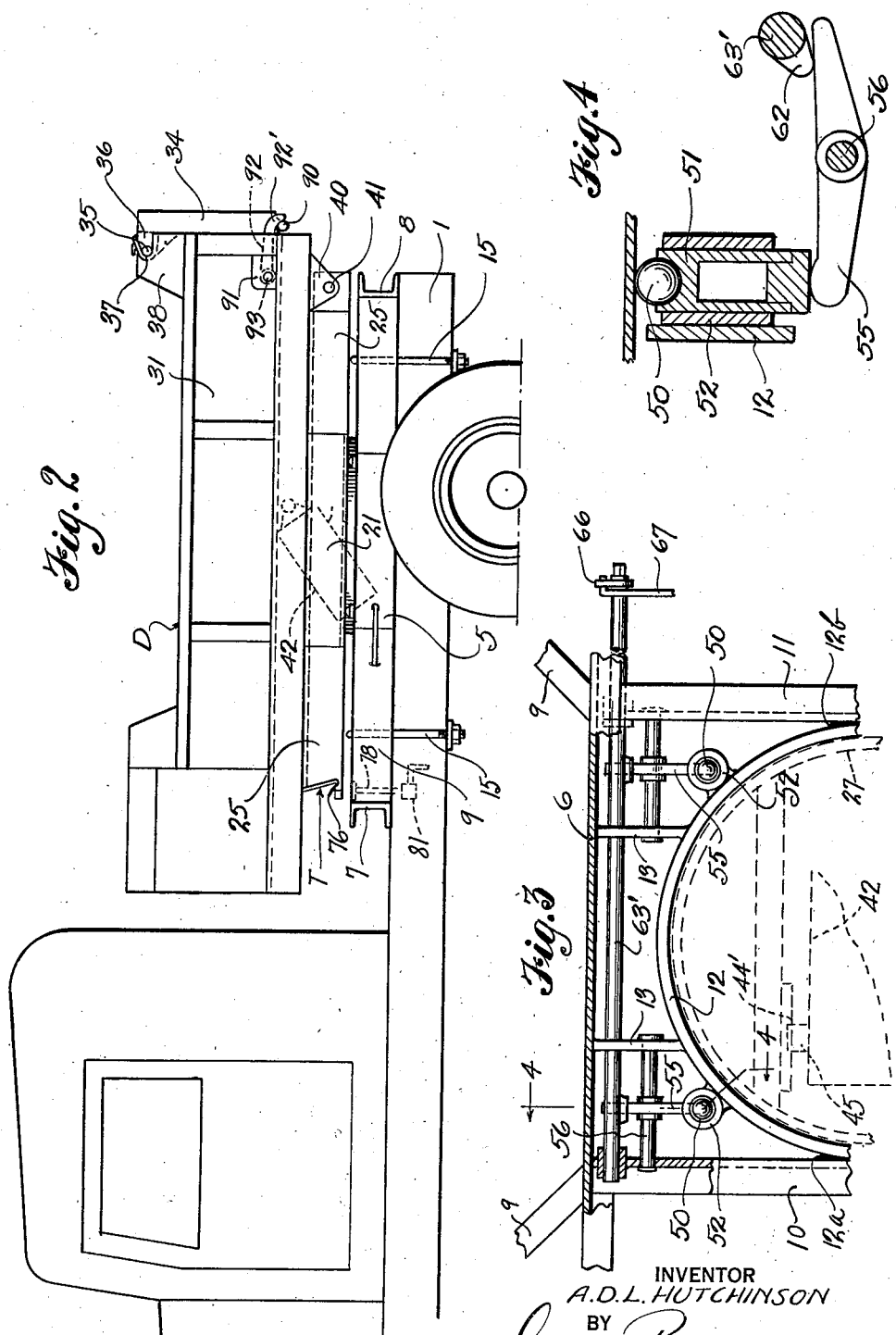

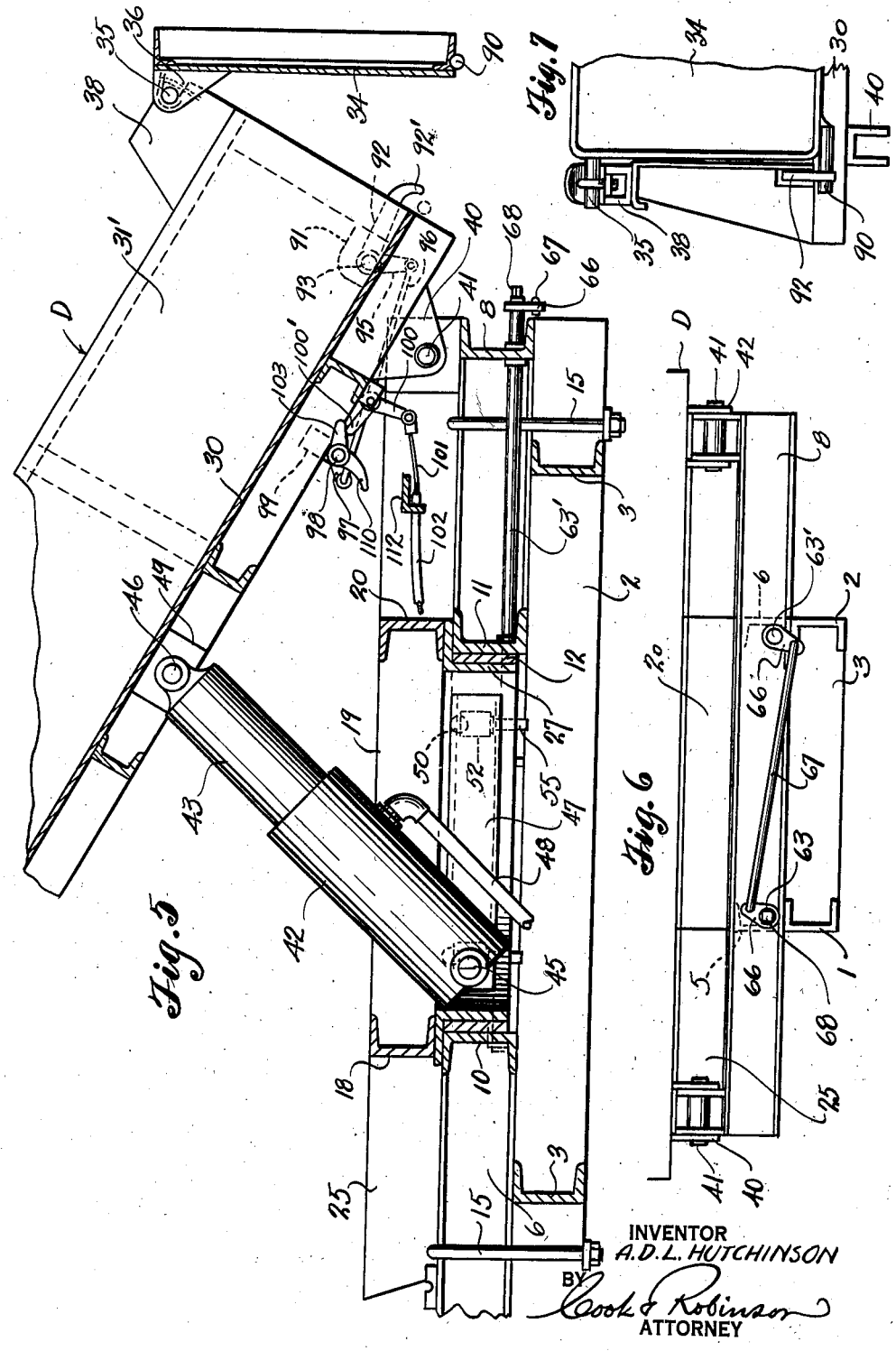

April 7, 1942.  A. D. L. HUTCHINSON  2,278,446
DUMP TRUCK
Filed June 15, 1940  4 Sheets-Sheet 4
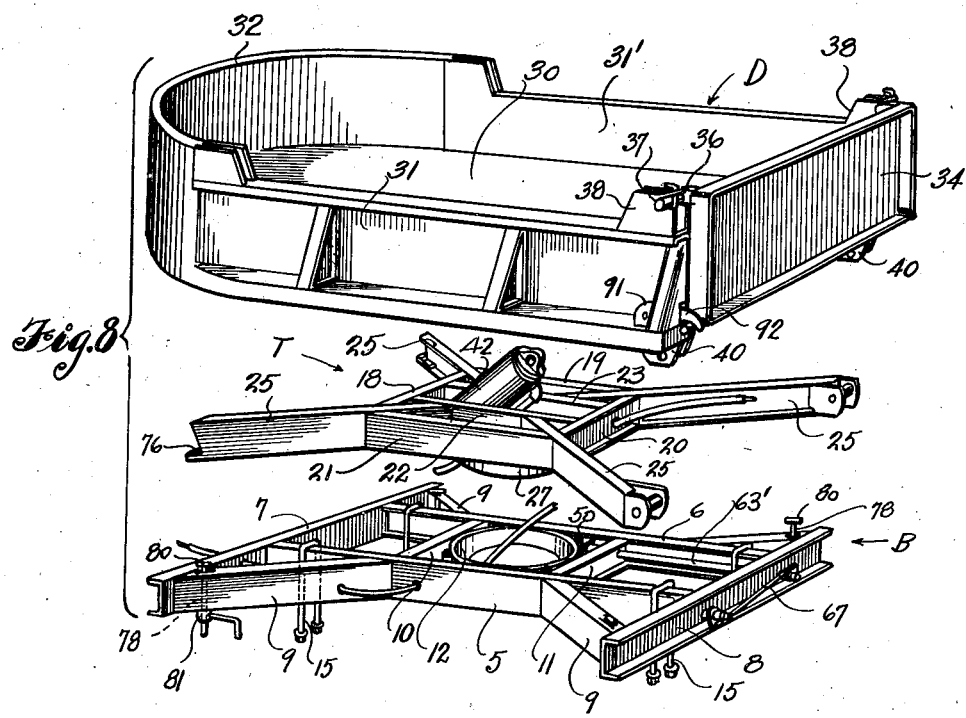
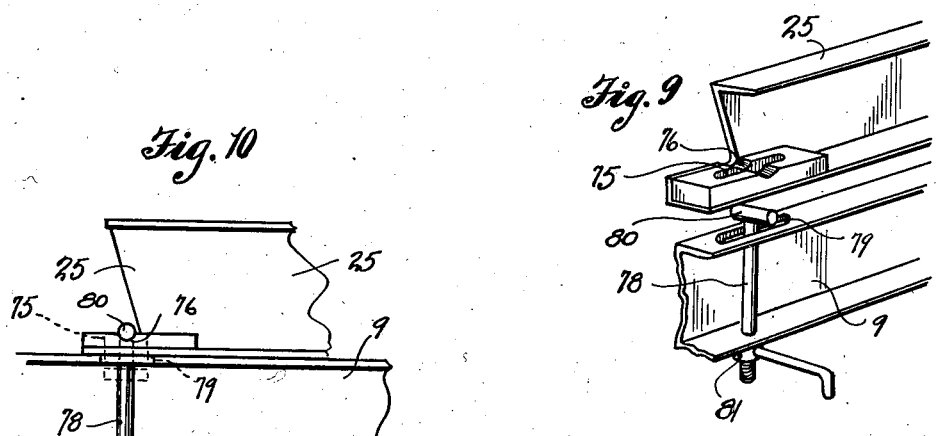
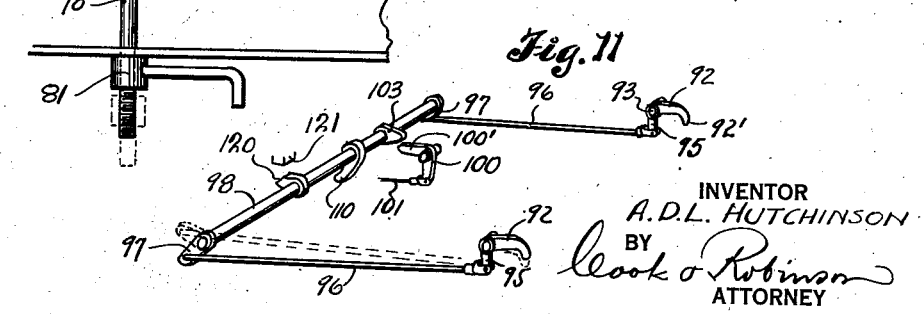
INVENTOR
A.D.L. HUTCHINSON
BY Cook o Robinson
ATTORNEY Patented Apr. 7, 1942

2,278,446

UNITED STATES PATENT OFFICE 2,278,446

DUMP TRUCK

Archie D. L. Hutchinson, Seattle, Wash.

Application June 15, 1940, Serial No. 340,733

9 Claims. (Cl. 298—9)

This invention relates to dump body vehicles, and has reference more particularly to improvements in what are known in the art as "dump trucks," wherein the load carrying body is pivotally mounted and is adapted to be mechanically tilted upwardly about the pivot axis for dumping a load from the end thereof.

It is the principal object of the present invention to improve the utility of dump body vehicles of the above character by the provision of a carrying frame on the truck for the dump body, that is rotatably movable in such manner that the dump body may be positioned at various dumping locations within a turning arc of approximately 180°, extending from one side of the vehicle, about the rear end thereof and to the opposite side.

More specifically stated, it is the object of the present invention to provide an improved form of dump truck, wherein the dump body is mounted by a turn table structure, which, in turn, is rotatably adjustable on a base frame structure mounted on the carrying vehicle which may be a truck, or other powered road vehicle, to provide for locating the dump body in position for end dumping to the rear of the vehicle, or to locate it in positions for dumping directly to either side, or, if occasion arises, to permit dumping to any position within the limits of rotary adjustment of the turn table frame. Furthermore, to provide a hydraulic jack mechanism, on the turn table, connected with the dump body for actuating it to and from dumping position.

Other objects of the invention reside in the provision of means whereby the turn table frame, which is normally secured against rotation and resting on the base frame, may be adjusted vertically into the clear of the base frame, and supported by anti-friction means for easy turning. Furthermore, to provide novel means for locking the turn table at selected positions of rotary adjustment within its turning limits.

Still further objects of the invention reside in the manner of hinged suspension for the tail gate and in the provision of novel latching means for locking the gate against opening, together with manual means for releasing the latch, and automatic means for moving it to gate holding position incident to the lowering of the dump body from dumping to horizontal position.

Still other objects of the invention reside in the details of construction of the various frame structures, in their combination, and in the mode of operation of parts as will hereinafter be fully described.

In accomplishing these and other objects of the invention, I have provided the improved details of construction, the preferred forms of which are illustrated in the accompanying drawings, wherein—

Fig. 2 is a side view of the truck, showing the arrangement of frames and the manner of mounting the dump body thereon; also, showing the turn table frame as adjusted to clear it, for rotation, free of the supporting base frame.

Fig. 3 is a plan view of one side portion of the base frame structure, showing the location of anti-friction supports for the turn table.

Fig. 4 is an enlarged, sectional detail on the line 4—4 in Fig. 3, showing the lifting cam and lever for the anti-friction support.

Fig. 5 is an enlarged sectional view, in a vertical plane, longitudinally of the truck, illustrating the assembly of frames on the truck, and the pivotal mounting of the dump body on the turn table frame; the dump body being shown in raised position and the tail gate open.

Fig. 6 is a rear end view of the base frame and turn table frame as mounted on the truck frame, and showing the mounting of the dump body.

Fig. 7 is a detail, illustrating the hinged mounting of one end of the tail gate, and the latch device at that end.

Fig. 8 is a perspective view showing the base frame, the turn table frame and the dump body in disconnected relationship.

Fig. 9 is a perspective view illustrating the provision of means for locking the turn table frame against rotative movement on its base frame.

Fig. 10 is a side view of the same parts.

Fig. 11 is a perspective view of the gate latch devices and the actuating linkage.

Figure 1:
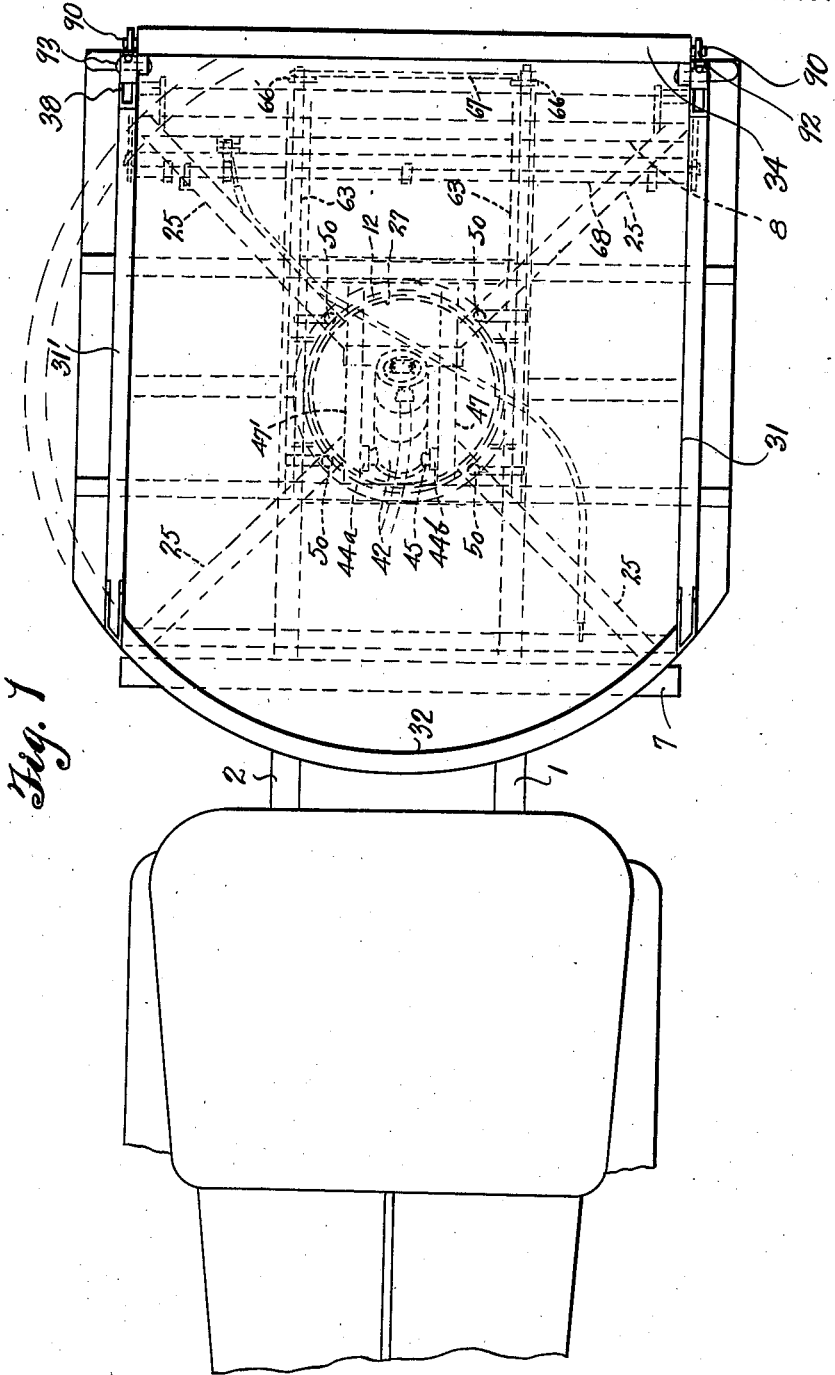
Fig. 1 is a plan view of an automobile truck, equipped with a dump body in accordance with details of the present invention.

Referring more in detail to the drawings—

While the present dump body structure is primarily intended for mounting on, and use in connection with the ordinary types of automobile trucks, it is not intended that it shall be limited thereto, since it may well be applied to rail cars and the like. In Figs. 1 and 2 of the present drawings, it has been illustrated as being mounted upon the rear end portion of an automobile truck frame which includes the two longitudinal opposite side beams 1 and 2, and the transverse beams 3, which, as noted in Fig. 5, connect the side beams at suitable intervals to provide the necessary strength and rigidity.

The dump body is designated in its entirety by the reference character D, and will presently be described in detail. This body is mounted upon the truck frame through the mediacy of, first, a base frame structure designated in its entirety by reference character B, and second, a turn table structure designated in its entirety by reference character T; these parts being best shown in their disconnected relationship in Fig. 8.

First describing the base frame structure B: This comprises two, co-extensive, longitudinal beams 5 and 6, joined across their front and rear ends by cross beams 7 and 8. The beams 5 and 6, for purpose of easy mounting on the truck frame, are spaced apart a distance that corresponds to the spacing of the beams 1 and 2, and the cross beams 7 and 8 are of such length as to define a substantially square frame structure; it being noted that the beams 7 and 8 extend at their ends laterally of the beams 5 and 6, and equally to opposite sides thereof. This frame also includes the diagonally arranged, brace beams 9 extended between the outer end portions of the cross beams and the adjacent longitudinal beams, as noted in Fig. 8; all beams 9 being in lines diverging from the common center of the frame, and at 90° intervals.

The frame structure B also includes two parallel cross beams 10 and 11 fixed between the beams 5 and 6; thus, with the latter beams, setting off a rectangular area within this frame, which encloses a cylindrical ring-like member 12.

This cylindrical member 12 is horizontally disposed with its vertical axial line coinciding with the center of the frame, and is of a substantial depth, as will be understood by reference to Fig. 5. Preferably, the ring is fixed at front and rear points, as at 12a and 12b in Fig. 3, to the cross beams 10 and 11, by welding or otherwise, and is additionally supported by cross webs 13, as noted in Fig. 3, that extend between the side portions of the ring and the longitudinal side beams 5 and 6 of the base frame.

In mounting this base frame B upon the truck frame, the longitudinal beams 5 and 6 thereof will be disposed to directly overlie the longitudinal beams 1 and 2 of the truck frame, and they may then be conveniently secured to the truck frame by the application of U-bolts 15 about the coinciding longitudinal beams, as will be understood by reference to Figs. 2 and 5. Thus, the base frame may be fixed rigidly and securely to the truck frame.

The turn table frame T is assembled with the frame B for rotation thereon, and in its preferred construction, comprises a substantially square central frame structure, formed by the four channel beams 18, 19, 20 and 21.

Within this rectangular structure are two, spaced longitudinal beams 22 and 23, that are symmetrically located therein at opposite sides of the central axis. Also, there are four radially extending beams, or legs 25 secured in the frame and projecting from the four corners thereof, as noted in Fig. 8, and these are of the same length, and at 90° spacing with reference to the central axis of the frame, and are adapted, when the frame T is supported on frame B, to normally directly overlie the brace beams 9.

Fixed to the under side of the frame structure T, centrally thereof, is a short, horizontally disposed cylindrical member 27, adapted, when the frames are functionally assembled, to be rotatably contained within the ring 12 of the base frame, and it will be understood by reference to Fig. 5, that when the parts are assembled, this turn table frame T may be allowed to rest flatly upon the frame B.

The dump body D may be of any suitable form of construction, but is here shown as comprising a base or bottom wall structure 30, vertical opposite side walls 31 and 31', a front wall 32, that is circularly curved about the vertical axial line of rotation of the body. At the rear end of the body is the tail gate 34, and this is swingingly suspended by means of hinge trunnions 35 extending laterally from the upper edge corners thereof; these trunnions being mounted by brackets 36 whereby they are inset from the plane of the gate, and the trunnions are pivotally contained in sockets 37 provided in brackets 38 that are fixed upon the top edges of the side walls of the body and adjacent the rear end. Since the hinge trunnions are inset from the plane of the gate, as seen in Figs. 2 and 5, the natural tendency of the gate, when the body is in lowered position, is to swing to and remain in closed position.

At the rear end of the base structure of the dump body, and symmetrically spaced at opposite sides of the longitudinal center, are downwardly extending hinge brackets 40 that are mounted by hinge pins 41 that extend through these brackets and through the rear end portions of two adjacent corner legs 25 of the frame T; thus to provide that the free end of the dump body may be swung vertically between its lowered position, as seen in Fig. 2, and the dumping position in which it is shown in Fig. 5.

Dumping actuation of the body is effected by means of a hydraulic jack, shown best in Fig. 5. This jack comprises a hydraulic cylinder 42 in which a piston portion 43 is slidably contained. The cylinder has trunnions 45 at its lower end whereby it is pivotally mounted in bearings 44a and 44b, see Figs. 1 and 3, that are fixed to spaced beams 47—47 that extend across the ring 27. The upper end of the piston portion 43 is pivotally connected by a pin 46 to parts attached to the base frame structure of the truck body. It will be understood that the arrangement of the jack is such that with the extension of the piston, the dump body will be moved about its pivotal mounting toward raised position, and when the pressure medium is released for flow from the cylinder, the body will be lowered accordingly. Hydraulic medium may be applied to the jack cylinder through a flexible hose connection 48, and could be supplied from a source of supply carried in the usual tank on the truck, and applied by a pump under control of suitable valve mechanism located convenient to the driver of the vehicle; these parts not being herein illustrated.

One of the main features of the present invention resides in the provision of the turn table mounting for the dump body and the hydraulic jack mounted to turn with the table. Another feature resides in the provision of means for obtaining a clearance between the base frame and turn table frame for easy rotation of the body for locating it in position for dumping to either side of the vehicle or directly to the rear end thereof. This will now be described.

It will be understood that in equipment of this particular kind, the weight of the dump body would make it very difficult to rotate the turn table unless provision were made for clearing the turn table from close contact with the base frame. Therefore, I have provided, in the base frame B, four ball bearing supports 50 for the turn table. These are located at equally spaced intervals about the turning axis, as will be understood by reference to Figs. 1 and 3, and just outside the ring 12. Each ball is mounted at the upper end of a post 51, and the posts are vertically slidable in guide sleeves 52 that are welded to the ring 12, as will be understood by reference to Figs. 3 and 4. The lower ends of the slides project below the sleeves and are engaged by the ends of lever arms 55, which are pivotally mounted by supporting shafts 56 that extend between the cross beams 9—10 and the webs 13 with the outer ends of the levers extended beneath paired cam shafts 63 and 63', and adapted on rotation of the shafts, to be engaged by cams 62 that are fixed thereon. The two cam shafts are rotatably mounted in the base frame structure at opposite sides of the ring 12, and extend in parallel relationship to the rear of the truck where each is equipped with a turning lever arm 66, as noted in Fig. 6, and the lever arms are connected by a cross link 67, as in Fig. 6. One, or both of the shafts, is provided at its rear end with a wrench head, as at 68, for reception of a wrench, whereby the shafts may be turned, and incident to the turning operation, effect the actuation of the levers 55 for raising the slides 51 and thus, through the mediacy of the ball bearings, lift the turn table frame slightly upwardly from the base frame, to provide turning clearance. This clearance is approximately one-half inch, and permits the turn table to be rotated freely to place the body in the desired dumping position; it being noted that the ball bearings engage against a flat plate 70 that is fixed to the turn table frame about the ring 27. When this desired dumping position of the body has been determined, the cam shafts are actuated to lower the slides and thus to seat the frame T solidly upon the base frame, and it is intended that when seated, the radial corner legs 25 thereof will rest in registration upon the angular brace beams 9 of the base frame in order that these parts may be locked together to hold the turn table and body against rotation.

The locking devices are applied at the outer ends of two of the legs 25, and one is illustrated in Figs. 9 and 10, which shows the corner leg 25 as provided at its outer end with a longitudinal slot 75 and with a cross seat 76. In the underlying brace beam 9, there is mounted a vertical bolt 78 that extends through a longitudinal slot 79 in the top flange of beam 9 and is equipped at its top end with a cross head 80 adapted to be disposed in the seat 76. Also, a nut 81 is applied to the lower threaded end of the T-bolt, adapted to be tightened to draw the parts tightly together, as seen in Fig. 10.

It is explained that while only two adjacent legs 25 of the frame T are equipped with slots and seats to receive the upper ends of locking bolts 78, all of the corners of the base frame carry locking bolts. Thus, the turn table frame may be locked in any of its positions for lateral or rear dumping.

Next, referring to the gate locking means, which is shown best in Figs. 5 and 6, it will be observed that, at the two lower corners of the gate, are laterally extending studs 90, and pivotally mounted in housings 91 on the side walls of the body, are latch levers 92, mounted by pivot shafts 93. The latch levers extend rearwardly and have downturned end portions 92'. When the gate is closed, these latches are adapted to lock over the end studs 90, as noted in Fig. 2, to hold the gate closed.

Extending downwardly from the pivot shafts are lever arms 95 to which forwardly extending links 96 are pivotally attached. At their forward ends, the links have pivotal connection with lever arms 97 fixed on a cross shaft 98, rotatably supported from the base structure of the body by brackets 99.

Also, pivotally mounted on the base frame structure of the body, as noted in Fig. 5, is a bell crank lever 100, to one arm of which a cable 101 is attached. The cable is extended forwardly, through suitable guides 102, to a position accessible to the driver of the vehicle. The other arm 100' of the bell crank lever 100 extends forwardly for contact with the under side of a lever arm 103, extending rearwardly from the cross shaft 98; the arrangement being such that pull on the cable actuates the bell crank to engage arm 103 and effect a rotative movement of the cross shaft 98, which, through the linkage 96 provided, will throw the latch lever 92 upwardly to release the gate.

It is also to be noted that a cam lever arm 110 is fixed to the cross shaft 98, and upon the lowering of the body from the position of Fig. 5 to the position of Fig. 2, this cam lever arm will finally engage with a fixed stop 112 on the turn table frame, thereby to rotatably actuate the cross shaft to effect, through the disclosed linkage, the downward actuation of the latch 92 into holding contact with the gate; it being understood that when the body is lowered, the gate automatically swings to its closed position by reason of the inset relation of its hinge axis.

A feature of this latch mechanism resides in the fact that when the cam arm 110 engages the stop 112, and rotatably actuates the cross shaft, it swings the lever arm 97 and link 96 across a dead center line relative to the shaft 98 and brings an arm 120, fixed on the shaft 98, up against an abutment 121. This positively holds the latches against release from the gate studs 90. This permits the body to be elevated for dumping, and the gate released at will of the driver by pull on the release cable 101.

Having thus described my invention, what I claim as new therein and desire to secure by Letters Patent is:

1. In a dump vehicle of the character described, a base frame structure fixed to the vehicle, and having a centrally located annular bearing collar, a turntable frame mounted upon the base frame and having a central annular bearing member rotatably fitted in said collar and adapted for vertical slippage; said turntable frame being adapted normally to rest flatly upon the base frame, a dump body mounted on the turn table frame, a plurality of vertical guides fixed in the base frame about the axis of rotation of the turn table, posts vertically movable in said guideways, anti-friction means at the upper ends of said posts, manually operable means in the base structure for simultaneously lifting all posts to have said anti-friction means at their upper ends to engage and lift the turn table frame clear of the base frame for turning movement.

2. A dump truck as recited in claim 1 wherein said manually operable means in the base structure comprises shafts rotatably mounted in the base structure and having a connection for rotating in unison, means for rotating the shafts, cams on the shafts, and levers pivoted in the base frame and operatively engaging the lower ends of the posts and also operatively engaging the cams for actuation thereby for lifting and lowering of the turn table frame.

3. In a dump body vehicle of the character described, a base frame structure fixed to the vehicle frame, a turn table frame mounted on the base frame for turning adjustment about a vertical axis, a dump body mounted on the turn table frame for end dumping, means on the turn table frame for actuating the body to and from dumping position, locking bolts mounted in the base frame, and having cross heads at their upper ends; said turn table frame having seats formed therein to receive said cross heads thereagainst, and nuts on the lower ends of the locking bolts for drawing the cross heads into said seats to hold the turn table frame against turning.

4. In a dump vehicle of the character described, a base frame, an upwardly opening annular bearing of substantial diameter fixed therein, a turntable frame mounted to normally rest upon the base frame and having a cylindrical hub rotatably and slidably fitted in the said annular bearing; a dump body mounted on the turntable frame, means supported within the said cylindrical hub and operatively attached to the body for actuating it to and from dumping positions, a lifting means on the base frame outside the annular bearing and operable against the turntable frame to lift it clear of the base frame for easy turning.

5. A dump vehicle of the character described comprising a base frame structure fixed to the vehicle, and having an annular upwardly opening bearing of substantial diameter fixed therein, a turntable frame mounted upon the base frame to normally rest non-rotatably thereon, a central cylindrical hub fixed in the turntable frame and rotatably and slidably fitted in said annular bearing, a dump body hingedly mounted on the turntable frame, power mechanism mounted in the hub member supported by and contained within the hub member for actuating the dump body to dumping position, lifting devices mounted in the base frame outside the annular bearing for contact with the turntable frame and manually controlled means for actuating the lifting devices to move and support the turntable frame clear of the base frame to permit rotary adjustment thereof.

6. A dump vehicle of the character described, comprising a horizontal base frame structure fixed to the vehicle and having an open cylindrical bearing of substantial diameter fixed therein, a turntable frame mounted to normally rest non-rotatably upon the base frame and having a central open hub of cylindrical form fitted rotatably in said cylindrical bearing and vertically slidable therein for clearing the turntable frame from direct bearing upon the base frame; a dump body mounted hingedly on the turntable frame, means mounted in said hub connected with the dump body to actuate the latter to and from dumping positions, a plurality of lifting devices mounted in the base frame outside the cylindrical bearing for contact with the turntable frame, means for actuating said lifting devices to engage and support the turntable frame therein in the clear of the base frame for rotary adjustment, and releasable means at predetermined positions of rotary adjustment of the turntable frame for fixing it to the base frame.

7. In a dump vehicle of the character described, a base frame, an upwardly opening annular bearing of substantial diameter fixed therein, a turntable frame mounted to normally rest upon the base frame, and having a cylindrical hub rotatably and slidably fitted in the said annular bearing, a dump body mounted on the turntable frame, means movable with the turntable frame for actuating the dump body to and from dumping positions, lifting devices mounted in the base frame outside the said annular bearing and operable against the turntable frame to lift it clear of the base frame for easy turning; said turntable frame having a flat base surface surrounding the hub portion and said lifting devices having anti-friction bearing means at their upper ends engaging the said flat base surface.

8. A device as recited in claim 4 wherein the means for actuating the dump body to and from dumping position comprises a fluid pressure medium jack having the cylinder and piston thereof operatively connected respectively with the hub bearing and the dump body, and a flexible conduit extending to said jack through the annular bearing for supplying a fluid pressure medium thereto.

9. In a dump vehicle of the character described, a base frame structure fixed to the vehicle and having a centrally located annular upwardly opening bearing of substantial diameter, a turntable frame mounted to normally rest upon the base frame and having a central cylindrical hub rotatably and slidably fitted in the said annular bearing, a dump body mounted on the turntable frame, and means movable with the turntable frame for actuating the dump body to and from dumping positions; said base frame being provided at equal angularly spaced intervals about the annular bearing with locking devices and said turntable frame being provided at equal angularly spaced intervals with parts to be engaged by said locking devices in the various positions to which the turntable may be functionally adjusted.

ARCHIE D. L. HUTCHINSON.